UNITED STATES PATENT OFFICE.

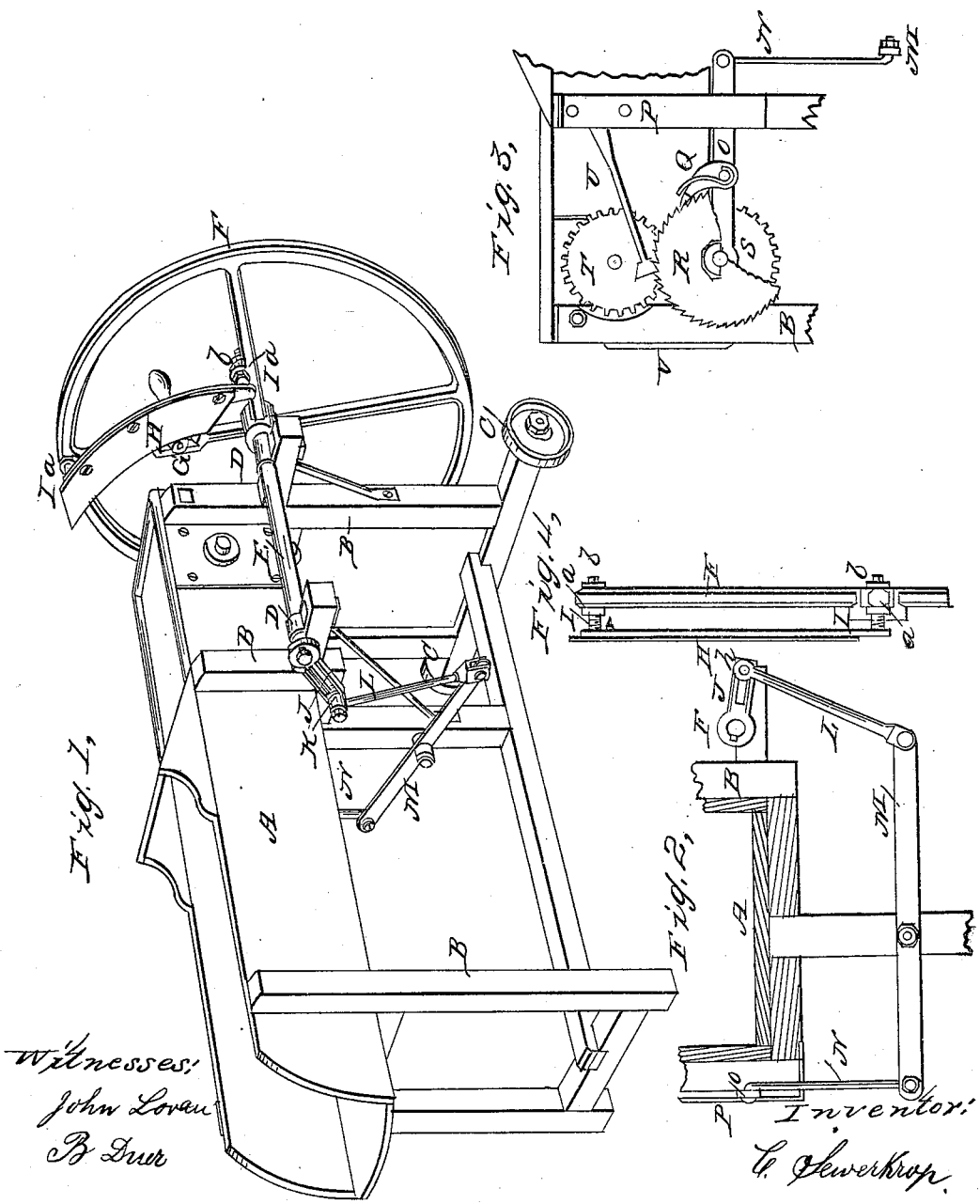

C. SEWERKROP, OF LOUISVILLE, KENTUCKY.

CUTTING-BOX.

Specification of Letters Patent No. 29,524, dated August 7, 1860.

*To all whom it may concern:*

Be it known that I, C. SEWERKROP, of Louisville, in the county of Jefferson and State of Kentucky, have invented certain new and useful Improvements in Cutting-Boxes; and I do hereby declare that the following is a full and exact description of the same, reference being had to the accompanying drawings, which form a part of this specification.

The nature of my invention consists in so arranging the attachments of the knife to the balance wheel, that the knife can very easily and very securely be connected thereto; also in connecting the rods and levers by which the feed motion is operated, to the shaft from which they derive their motion by means of a slotted crank, so that the feed motion may be easily adjusted giving more or less feed at each cut as may be desired.

In the accompanying drawings Figure 1 is a perspective view of the machine, Fig. 2 is a section showing the feed motion attachment, Fig. 3 is a side elevation illustrating the operation of the feed motion and Fig. 4 is a side view of a portion of the balance wheel showing the method of attaching the knife.

A is the box of the machine supported in framing B the front portion of which may be supplied with wheels C for the purpose of rendering more easy the transmission of the machine from place to place as may be most convenient for its operation. On one side of the machine two pieces extend from the framing to give support to two journals D in which the shaft E that is parallel with the length of the cutting box, can rotate, and on the front end of this shaft outside of the front journal the balance wheel F is secured by a key. On one of the arms of the balance wheel F there is a slot G in which the handle is secured by a screw on its end that passes through the slot so that a nut and washer can be used in making it fast. At the junction of one of the arms with the periphery of the balance wheel there is a hole, as there is also in the next arm, and through these the screws that secure the knife are passed. The knife H is curved as regards its edge and back, and to the ends of the stock to which it is secured, there are attached at right angles two screws I, I, each provided with two nuts one of which $a$ is kept inside between the balance wheel and the knife, and the other $b$, secures the knife to the wheel by being screwed on I, I, on the outside of the wheel F, so that the two nuts $a$ and $b$ on each screw I act as jam nuts and hold the knife securely to the wheel. The knife H is attached to the stock by screws or in any ordinary manner. This attachment will be seen in Fig. 4. The knife is thus made adjustable.

On the end of the shaft E opposite to the balance wheel is a slotted crank J which is also keyed on to it and in this slot there is secured a pin by nuts in the usual manner so that the pin can be moved up and down in the slot. To this pin K a pitman L is connected by a wrist and the lower end of the pitman is secured in a suitable manner to a rocking shaft which moves on a center on a portion of the framing B, and the rocking shaft M extends across the box so that its other end projects nearly as far from the side of the box as the end to which the pitman is connected extends from the side beyond which it projects. A link N is connected with the end of M opposite to the pitman and to the upper end of N a rocking bar is connected by a pin, this rocking bar O moves in a guide P at the side of the box and carries a pawl Q on it which is kept into the teeth of the ratchet by a small spring $c$. The end of this rocking bar O moves as on a center on the shaft of the ratchet wheel R and gear wheel $s$ which while it is on the same shaft as the lower roller gives motion by the corresponding gear wheel T on whose shaft the upper feed roller is placed. The ratchet wheel R is held in its place and prevented from slipping back when moved by the pawl on the rocking bar by a retaining pawl U which is capable of moving freely up and down sufficient to allow of the teeth of the ratchet passing under it in the one direction and preventing them doing so in the other. Around the front of the box, before which the knife works is a framing of iron or steel, V, to prevent it being damaged by the stalks or other material cut, and also to add stability to the whole and afford a firmer support to the stalks while being cut. All these parts are well shown in Figs. 3 and 2.

The operation of the machine is as follows: As the balance wheel is rotated by the handle it of course gives motion to the wrist pin K on the slotted crank J on the end of the shaft E and here the circular motion of the wheel is converted into reciprocating. It is evident that when the wrist pin is adjusted at the extreme outer end of the slotted crank it will traverse a greater distance than when close to the shaft and the distance between its highest and lowest point be greater in accordance with the diameter of the circle which it describes. By this means greater or less motion can be given to the rocking shaft M, and so through it by the link N to the rocking bar O and pawl Q, making the latter take a greater or less number of the teeth of the ratchet wheel R, at each reciprocation of the shaft or its equivalent, in time, or at each revolution of the knife H so that a greater or less cut can be given on the material making it coarser or finer, as desired, by simply altering the position of the wrist pin K in the slotted crank J.

In the operation of this machine there is a great advantage which is attained by the adjustability of the knife H. The ordinary tendency of such knives attached to balance wheels is when they meet with the resistance of the material to be cut, that they are more or less caused to "wind" and so throw the balance wheel out of its true position to keep the knife close against and parallel with the front V of the cutting box so the cutting action resembles that of a pair of shears the part V of the box forming one edge against which the knife H can cut. By the arrangement of the jam nuts $a$ and $b$ on the screws I, the knife can always be maintained perfectly close to and parallel with the front of the cutting box, and can be firmly secured in that position thus preventing any tendency to "wind" or throw the balance wheel out of its parallelism and thereby increase the ease with which the machine will work, and facilitate the cutting action of the knife on the stalks or other material contained in the box.

Having thus described my invention, what I claim and desire to secure by Letters Patent of the United States is as follows:

The slotted crank J, on the shaft E, in combination with the pitman L, rocking shaft M, and devices for imparting feed motion O, Q, R, all arranged substantially as and for the purposes described.

C. SEWERKROP.

Witnesses:
 JOHN LAVAN,
 B. AUER.